# (12) United States Patent
Lim et al.

(10) Patent No.: US 8,676,229 B2
(45) Date of Patent: Mar. 18, 2014

(54) APPARATUS AND METHOD FOR CONTROLLING WHETHER TO PROVIDE LOCATION INFORMATION IN BROADBAND WIRELESS ACCESS SYSTEM

(75) Inventors: Nae-Hyun Lim, Seoul (KR); Ju-Seung Lee, Suwon-si (KR); Dong-Keon Kong, Suwon-si (KR); Jun-Hyung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/367,838

(22) Filed: Feb. 7, 2012

(65) Prior Publication Data

US 2012/0202518 A1 Aug. 9, 2012

(30) Foreign Application Priority Data

Feb. 8, 2011 (KR) ........................ 10-2011-0010904

(51) Int. Cl.
*H04W 24/00* (2009.01)
*H04M 11/04* (2006.01)

(52) U.S. Cl.
USPC .................. 455/456.1; 455/456.6; 455/404.2

(58) Field of Classification Search
USPC .............. 455/432.1, 434, 435.1, 453.2, 435.3
See application file for complete search history.

(56) References Cited

U.S. PATENT DOCUMENTS

2007/0167177 A1* 7/2007 Kraufvelin .................... 455/466

OTHER PUBLICATIONS

3rd Generation Partnership Product 2 "3GPP2" C.S0022-B Version 1.0 Position Determination Service for cdma2000 Spread Spectrum Systems.*

* cited by examiner

*Primary Examiner* — Marisol Figueroa
*Assistant Examiner* — Erica Navar
(74) *Attorney, Agent, or Firm* — Jefferson IP Law, LLP

(57) ABSTRACT

A method and an apparatus for an operation of a Mobile Station (MS) in a wireless access system are provided. The method includes receiving a request to report measurement data required for location determination, determining whether it is in a state in which providing of location information is rejected, and if it is determined that it is in the state in which providing of location information is rejected, transmitting a message for reporting that providing of the location information is rejected.

14 Claims, 10 Drawing Sheets

APPARATUS AND METHOD FOR CONTROLLING WHETHER TO PROVIDE LOCATION INFORMATION IN BROADBAND WIRELESS ACCESS SYSTEM

PRIORITY

This application claims the benefit under 35 U.S.C. §119(a) of a Korean patent application filed in the Korean Intellectual Property Office on Feb. 8, 2011 and assigned Ser. No. 10-2011-0010904, the entire disclosure of which is hereby incorporated by reference.

BACKGROUND OF THE INVENTION

1. Field of the Invention

The present invention relates to a broadband wireless access system.

2. Description of the Related Art

In a next generation system, i.e., a 4th Generation (4G) communication system, research and commercialization are underway to provide users with various services having a data rate of about 100 Mbps or higher. More particularly, the 4 G communication system is currently being developed to ensure mobility and Quality of Service (QoS) in a Broadband Wireless Access (BWA) communication system, such as a Wireless Local Area Network (WLAN) system and a Wireless Metropolitan Area Network (WMAN) system. A representative example of such a communication system is an Institute of Electrical and Electronics Engineers (IEEE) 802.16 communication system.

According to a service protocol based on an IEEE 802.16e/m and Worldwide Interoperability for Microwave Access (WiMAX) network location, the following procedure proceeds upon receiving a request for delivering location information of a Mobile Station (MS). First, the location server requests a Base Station (BS) to deliver location measurement data of the MS. Upon receiving a request message, the BS delivers a SCaN-ReSPonse (SCN-RSP or Advanced Air Interface (AAI)_SCN-RSP) message, the MS measures a metric indicated by the SCN-RSP (or AAI_SCN-RSP) message and delivers a measurement value to the BS by using a SCaN-REPort (SCN-REP or AAI_SCN-REP) message. Upon receiving the measurement value, the BS delivers the measurement value to the location server. The location server calculates a location of the MS by using measurement data according to a pre-defined location calculation algorithm, and delivers location information to the MS which has requested the location information.

As described above, according to a current wireless protocol, upon receiving the SCN-RSP (or AAI_SCN-RSP) message, the MS always transmits the SCN-REP (or AAI_SCN-REP) message in response thereto. Furthermore, the location server can request location measurement data of one MS up to 16 times according to a configuration of a vendor. However, upon receiving a location measurement data request, the MS can reject transmission of measurement data for reasons of protecting a user's privacy, and the like. In this case, the BS cannot know why the location measurement data is not delivered from the MS, and determines that collecting of the measurement data has failed due to a bad a wireless environment of the MS. As a result, the BS repetitively retransmits the SCN-RSP (or AAI_SCN-RSP) message. Accordingly, although the MS does not transmit the measurement data, wireless resources are wasted due to the repetitive measurement data request of the BS.

Therefore, a need exists for an apparatus and a method for avoiding an unnecessary request of measurement data required to determine a location in a broadband wireless access system.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for avoiding an unnecessary request of measurement data required to determine a location in a broadband wireless access system.

Another aspect of the present invention is to provide an apparatus and a method for reporting whether a user or a Mobile Station (MS) rejects delivery of measurement data in a broadband wireless access system.

Another aspect of the present invention is to provide an apparatus and a method for reporting a duration in which a user or an MS rejects delivery of measurement data in a broadband wireless access system.

Another aspect of the present invention is to provide an apparatus and a method for reporting that a user or a MS allows delivery of measurement data in a broadband wireless access system.

In accordance with an aspect of the present invention, a method of operating an MS in a broadband wireless access system is provided. The method includes receiving a request to report measurement data required for location determination, determining whether it is in a state in which providing of location information is rejected, and if it is determined that it is in the state in which providing of location information is rejected, transmitting a message for reporting that providing of the location information is rejected.

In accordance with another aspect of the present invention, a method of operating a BS in a broadband wireless access system is provided. The method includes transmitting a request to report measurement data required for location determination to an MS, receiving a message for reporting that providing of location information is rejected, and notifying to a higher node that providing of location information is rejected.

In accordance with another aspect of the present invention, an MS apparatus in a broadband wireless access system is provided. The apparatus includes a modem for receiving a request to report measurement data required for location determination, and a controller for determining whether it is in a state in which providing of location information is rejected, and if it is determined that it is in the state in which providing of location information is rejected, for transmitting a message for reporting that providing of the location information is rejected.

In accordance with another aspect of the present invention, a BS apparatus in a broadband wireless access system is provided. The apparatus includes a modem for transmitting a request to report measurement data required for location determination to an MS, and for receiving a message for reporting that providing of location information is rejected, and a controller for notifying to a higher node that providing of location information is rejected.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following detailed description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
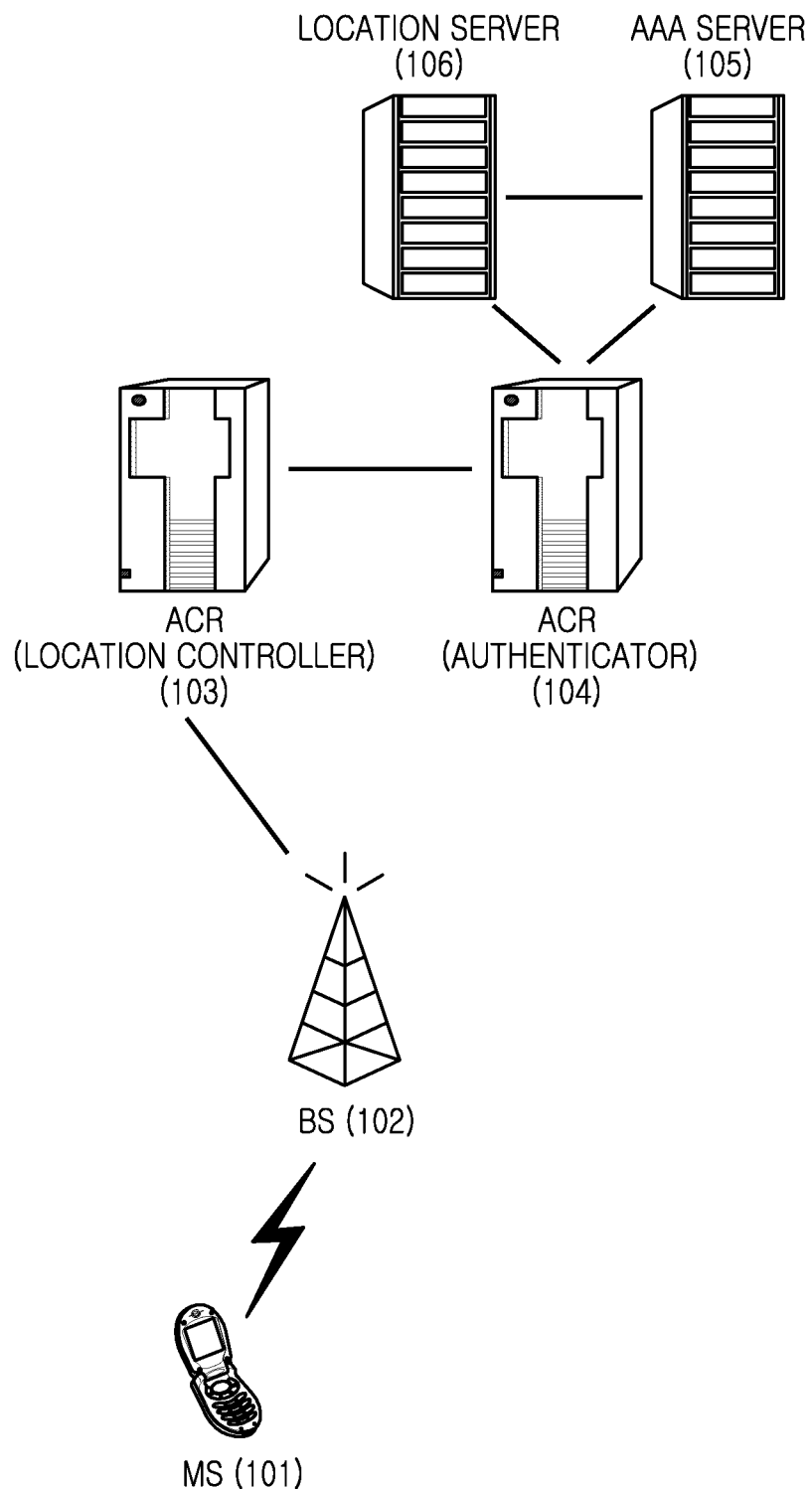
FIG. 1 is a schematic view illustrating a structure of a broadband wireless access system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

An exemplary embodiment of the present invention relates to an apparatus and a method for controlling whether to provide location information by a user in the broadband wireless access system. Exemplary embodiments of the present invention described hereinafter relate to a technique for avoiding an unnecessary request for measurement data required for location determination in a broadband wireless access system. Hereinafter, Orthogonal Frequency Division Multiplexing (OFDM)/Orthogonal Frequency Division Multiple Access (OFDMA)-based wireless communication system will be described.

For convenience of explanation, terms and names defined in a Long Term Evolution (LTE) standard are used in exemplary embodiments of the present invention. However, exemplary embodiments of the present invention are not limited to these terms and names, and thus can also apply to a system conforming to another standard.

An exemplary embodiment of the present invention provides a process of reporting a rejection duration and an intention of rejecting to provide location information of a Mobile Station (MS) and a process of resuming a location-based service by using a resume identifier in the rejection duration in a system including the MS, a Base Station (BS), and a location server.

Hereinafter, the MS includes the concept of an Advanced MS (AMS), the BS includes the concept of an Advanced BS (ABS), and an Access Control Router (ACR) includes the concept of an advanced ACR.

FIGS. 1 through 8, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

FIG. 1 is a schematic view illustrating a structure of a broadband wireless access system according to an exemplary embodiment of the present invention.

Referring to FIG. 1, the broadband wireless access system includes an MS 101, a BS 102, ACRs 103 and 104, an Authentication, Authorization, and Accounting (AAA) server 105, and a location server 106.

The MS 101 is a user equipment, and communicates with the BS 102 in a wireless fashion by accessing the BS 102. The MS 101 performs wireless communication according to a system protocol. For example, the MS 101 can support a wireless protocol provided by Institute of Electrical and Electronics Engineers (IEEE) 802.16e, 16m, or 16n.

The BS 102 communicates with the MS 101 through a wireless channel, and takes a role as an intermediate device for accessing the ACR 103 which is a higher node. For example, the BS 102 can support a wireless protocol provided by IEEE 802.16e, 16m, or 16n.

The ACRs 103 and 104 control BSs including the BS 102 located in a macro vendor network, and connect the BSs to a core network. That is, the ACRs 103 and 104 route a data flow between a data core network and the BS 102, and deliver measurement data provided from the MS 101 to the location server 106 at the request of the location server 106. For example, in a case of a Worldwide Interoperability for Microwave Access (WiMAX) system, the ACR 103 can be referred to as an Access Service Network GateWay (ASN-GW). According to a function to be executed, the ACRs 103 and 104 can be referred to as a paging controller, an authenticator, a Data Path Function (DPF), etc. More particularly, when providing a location-based service, the ACRs 103 and 104 can be referred to as a location controller.

The AAA server 105 performs authentication and accounting of MSs including the MS 101. The location server 106 generates location information of the MS 101. That is, the location server 106 requests a 2nd MS to provide measurement data for determining location information of the 2nd MS at the request of a 1st MS, determines a location of the 2nd MS by using the measurement data, and generates information for reporting the location. In this case, the location server 106 determines whether the 2nd MS rejects to provide the measurement data for location determination, and requests the measurement data according to the determination result.

Figure 2A:
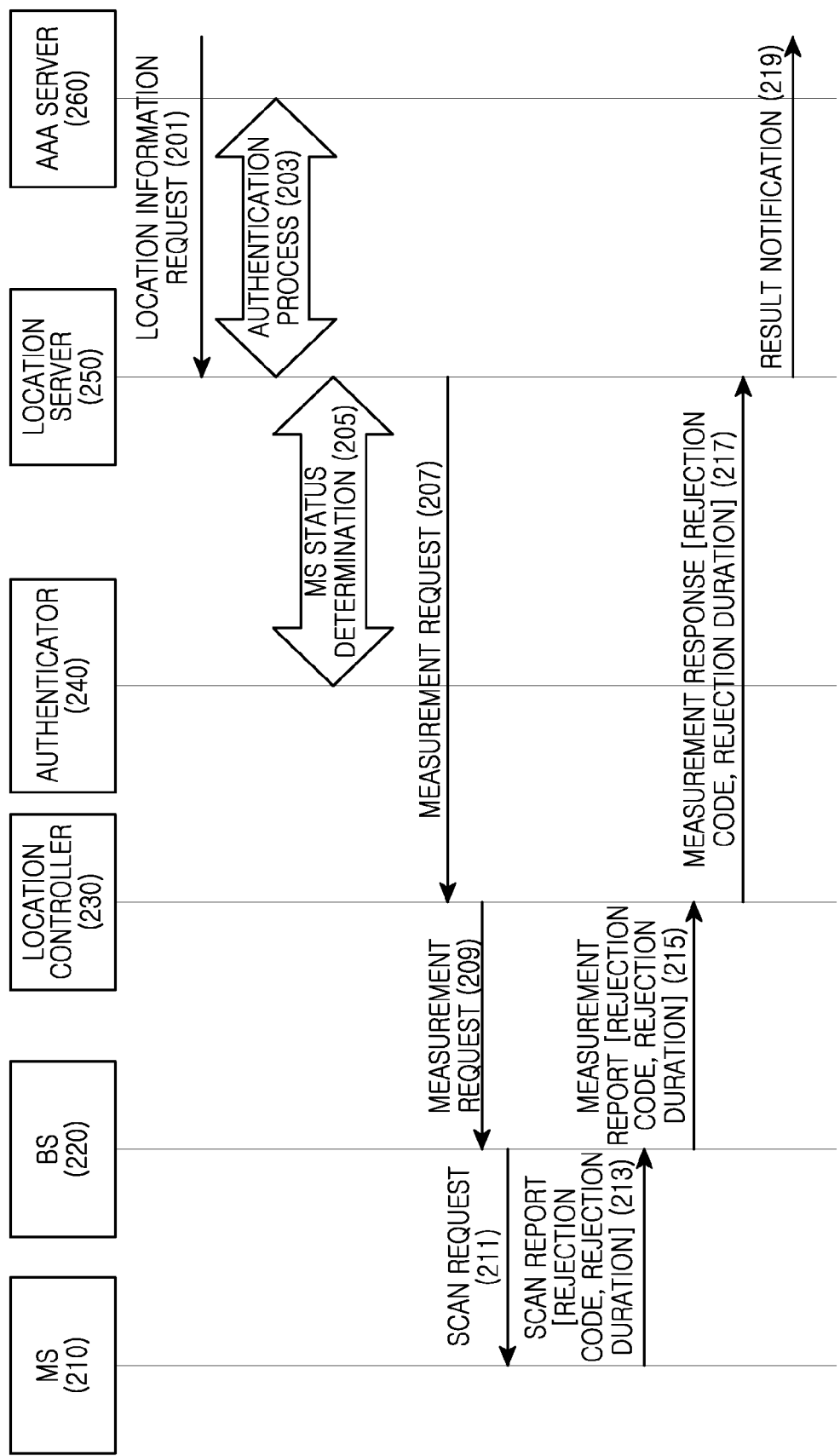
FIG. 2A illustrates a process of exchanging signals to reject providing of location information in a broadband wireless access system according to an exemplary embodiment of the present invention.

FIG. 2A illustrates a process of exchanging signals to reject providing of location information in a broadband wireless access system according to an exemplary embodiment of the present invention.

Referring to FIG. 2A, a location server 250 receives a request for location information of an MS 210 in step 201. A requester which requests the location information may be another MS.

In step 203, upon receiving the request of the location information, the location server 250 performs an authentication process with respect to an AAA server 260 to confirm whether the MS 210 is a user registered to a corresponding network, and obtains information of an authenticator 240 for managing the MS 210. In other words, the location server 250 confirms authentication information on the MS 210 via the authenticator 240, and confirms information for accessing an ACR capable of reporting state information of the MS 210.

In step 205, the location server 250 confirms a state of the MS 210 via the authenticator 240. In other words, the location server 250 confirms an operation mode of the MS 210. If the MS 210 operates in an idle mode, although not shown, the location server 250 requests the ACR for performing a paging operation to wake up the MS 210. That is, the location server 250 allows the MS to measure data for location determination and to change to a state capable of providing the measurement data.

In step 207, the location server 250 transmits to a location controller 230 a measurement request message for requesting data measurement for location determination. In step 209, the location controller 230 transmits to a BS 220 a measurement request message for requesting data measurement for location determination.

In step 211, the BS 220 transmits a scan request message to the MS 210. For example, the scan request message may be an unsolicited SCaN-ReSPonse (SCN-RSP) message or an unsolicited Advanced Air Interface_SCN-RSP (AAI_SCN-RSP) message. In this case, the scan request message includes information for reporting a metric to be measured by the MS 210. For example, the metric can include at least one of a Carrier Interference and Noise Ratio (CINR), a Received Signal Strength Indicator (RSSI), a Round Trip Delay (RTD), and a Relative Delay (RD).

In step 213, upon receiving the scan request message, the MS 210 determines whether to measure a metric requested according to a user's configuration, and transmits a scan report message. Herein, the scan report message may be a SCaN-REPort (SCN-REP) message or an AAI_SCN-REP message. In this case, an exemplary embodiment of the present invention assumes that providing of location information is rejected in the configuration. Accordingly, the MS 210 transmits the scan report message including information for reporting that providing of the location information is rejected and information for reporting a duration in which the rejection is maintained. For convenience of explanation, hereinafter, the 'information for reporting that providing of location information is rejected' is referred to as a rejection code and the 'information for reporting a duration in which rejection is maintained" is referred to as a rejection duration. For example, the rejection code may be one field, and may be set by a value for indicating a specific reason of rejection. For example, a value of the rejection code field may be set by 'privacy'. For example, the scan report message may include fields of Table 1 below.

TABLE 1

| Field | Size (bits) | Descriptions |
| --- | --- | --- |
| Rejection Code | 1 | Indicates whether AMS is allowed to be measured |
| Duration | variable | Indicates the interval AMS cannot be measured. |

In addition, the scan report message may further include fields shown in Table 2 below.

TABLE 2

| Field | Size (bits) | Descriptions | Condition |
| --- | --- | --- | --- |
| Scan duration | 8 | Duration (in units of AAI subframes) of the requested scanning period. | |
| Interleaving interval | 8 | The period of AMS's Active Mode (in units of AAI subframes), which is interleaved between Scan Durations. | |
| Scan Iteration | 6 | The requested number of iterating scanning interval by an AMS. | |

TABLE 2-continued

| Field | Size (bits) | Descriptions | Condition |
|---|---|---|---|
| Recommended start super frame number | 6 | Represents the 6 least significant bits of the absolute super frame index for which the AMS recommends the first Scanning Interval to start. This field is set to 0 if an AMS has no preferred value. | Present if AMS recommends a start super frame |
| Recommended start frame index | 2 | Recommended start frame index within a super frame. 0b00: the 1st frame in a super frame 0b01: the 2nd frame in a super frame 0b10: the 3rd frame in a super frame 0b11: the 4th frame in a super frame | Present if AMS recommends a start super frame |
| N_Recommended_ABS_Index | 6 | This is the number of neighboring ABS the AMS plans to scan, which are included in AAI-Narrow Band Receiver (NBR)-ADVanced (ADV) message [0 . . . 63]. When an AMS receives AAI-SCNRSP message from ABS in response to AAI-SCN-REQ message, the AMS shall determine whether Configuration Change Count stored by the AMS is the same as one included in AAISCN-RSP message sent by the ABS. If an AMS detects mismatch of Configuration Change Counts, it may retransmit AAI-SCN-REQ message to the ABS. | Present if AMS uses index instead of full 48-bits BS IDentification (BSID) to identify an ABS it plans to scan |
| If(N_Recommended_ABS_Index > 0) { Configuration Change Count of AAI-NBR-ADV | 3 | The value of Configuration Change Count in AAI-NBR-ADV message used for neighbor ABS index references | |
| If (Nbr_Bitmap_Index is present) { Nbr_Bitmap_Index | 8 | Each bit position corresponds to a ABS Index of the corresponding AAINBR-ADV message, where the least significant bit corresponds to the first ABS Index, each next significant bit corresponds to the next ABS Index in sequential order, the most significant bit corresponds to the ABS Index of the last requested ABS, and ABSs with ABS Index greater than the last requested ABS are not requested and do not have a corresponding bit position in the bitmap. Bitmap position bit value: 0: the corresponding ABS is not requested. 1: the corresponding ABS is requested Maximum size of the bitmap is 256 bits | |
| For(i=0; i< Num of bit which is set to 1 in Nbr_Bitmap_Index; i++) { N_Recommended_Carrier_Index | 6 | Number of carriers the AMS plans to scan at each | Present when a neighbor |

TABLE 2-continued

| Field | Size (bits) | Descriptions | Condition |
|---|---|---|---|
| | | neighbor ABS [0 . . . 63] | ABS is a multicarrier ABS |
| For(j=0; j<N_Recommended_Carrier_Index; j++) { | | | |
| Recommended Carrier Index | 6 | Requested physical carrier index for scan at each neighbor ABS | |
| } } } else { For(i=0; i<N_Recommended_ABS_Index; i++) { | | | |
| Neighbor ABS index | 8 | ABS index corresponds to the position of ABS in AAI-NBR-ADV message. | |
| N_Recommended_Carrier_Index | 6 | Number of carriers the AMS plans to scan at each neighbor ABS [0 . . . 63] | Present when a neighbor ABS is a multicarrier ABS |
| For(j=0; j<N_Recommended_Carrier_Index; j++) { | | | |
| Recommended Carrier Index | 6 | Requested physical carrier index for scan at each neighbor ABS | Present when a neighbor ABS is a multicarrier ABS |
| } } } }//end of If(N_Recommended_ABS_Index > 0) | | | |
| N_Recommended_ABS_Full | 6 | Number of neighbor ABS the AMS plans to scan which are using full 48-bit ABSID [0 . . . 63]. | Present if AMS decides to use full 48 bits BSID to identify an ABS |
| For(i=0; i< N_Recommended_ABS_Full; i++) { | | | |
| Recommended ABS ID | 48 | ABS ID of the ABSs the AMS plans to scan | |
| N_Recommended_Carrier_Index | 6 | Number of carriers the AMS plans to scan at each neighbor ABS [0 . . . 63]. | Present when a neighbor ABS is a multicarrier ABS |
| For(j=0; j<N_Recommended_Carrier_Index; j++) { | | | |
| Recommended Carrier index | 6 | Requested physical carrier index for scan at each neighbor ABS | Present when a neighbor ABS is a multicarrier ABS |
| } } | | | |
| N_Recommended_SA_Preamble_Index | 4 | Number of SA preambles the AMS plans to scan [0 . . . 15] | Present if AMS requests to scan SA preambles |
| For(i=0; i<N_Recommended_SA_Preamble_Index; i++) { | | | |
| SA Preamble Index | 6 | SA Preamble indices the AMS plans to scan | Present if AMS requests to scan SA preambles |
| } N_Recommended_Carrier_Index_at_Serving_ABS | 6 | Number of carriers the AMS plans to scan at each neighbor ABS. | Present if AMS decides to scan other |

TABLE 2-continued

| Field | Size (bits) | Descriptions | Condition |
|---|---|---|---|
| For(i=0; i<N_Recommended_Carrier_Index_at_Serving_ABS; i++) { | | | carriers of the S-ABS |
| Recommended Carrier index at S-ABS | 6 | Recommended physical carrier index of the S-ABS the AMS plans to scan | Present if AMS decides to scan other carriers of the S-ABS |
| } for (i=0; i<N_CSG_ID_Infos; i++) { | | N_CSG_ID_Infos is the number of CSG ID Information blocks [0 . . . 15]. | Optional for loop. May be included for quick CSG membership detection or ABS reselection assistance |
| Operator ID of the CSG Femtocell | 24 | The Operator ID of the CSG Femtocell | Present if the Operator ID is different from the one of the ABS |
| for (j=0; j<N_CSG_IDs; j++) { | | N_CSG_IDs is the number of Carrier Services Gateway (CSG) IDs belongs to this Operator ID. | |
| CSGID | variable | The CSGID within the Operator ID. It may be part of the BS ID, with certain bits inside indicating its length. If the CSG has single BS, it may be of maximum length which is the LSB-24 bits of the full BS ID. | |
| } ] | | | |

In step 215, upon receiving the scan report message including the rejection code and the rejection duration, the BS 220 transmits a measurement response message to the location controller 230. In this case, the measurement response message includes the rejection code and the rejection duration included in the scan report message.

In step 217, upon receiving the measurement response message, the location controller 230 transmits a measurement response message to the location server 250. In this case, the measurement response message includes the rejection code and the rejection duration.

In step 219, upon receiving the measurement response message including the rejection code and the rejection duration, the location server 250 recognizes that the MS 210 rejects to provide the location information, and notifies that providing of the location information to the MS which has requested the location information in step 201 is rejected. Furthermore, the location server 250 recognizes that providing of the location information is rejected during a duration indicated by the rejection duration included in the measurement response message. Therefore, even if the location information of the MS 210 is requested during the duration indicated by the rejection duration, the location server 250 immediately notifies that providing of the location information is not possible without transmission of the measurement request message of step 207. That is, the location server 250 registers the MS 210 as an MS not capable of providing the location information during the rejection duration. In other words, the location server 250 manages the MS 210 during the rejection duration in a state in which providing of the location information is rejected.

An MS which has received the notification for reporting that providing of the location information is rejected can request providing of the location information of the MS 210 when providing of the location information of the MS 210 is allowed. In this case, when the rejection duration is over, the location server 250 can perform a process for determining the location of the MS 210, and can provide the location information.

However, if it is notified that the location information will be provided from the MS 210 before the rejection duration is over, the location server 250 releases the MS 210 registered as the MS not capable of providing the location information. The process of releasing the MS 210 from the MS not capable of providing the location information will be described below with reference to FIG. 2B.

Figure 2B:
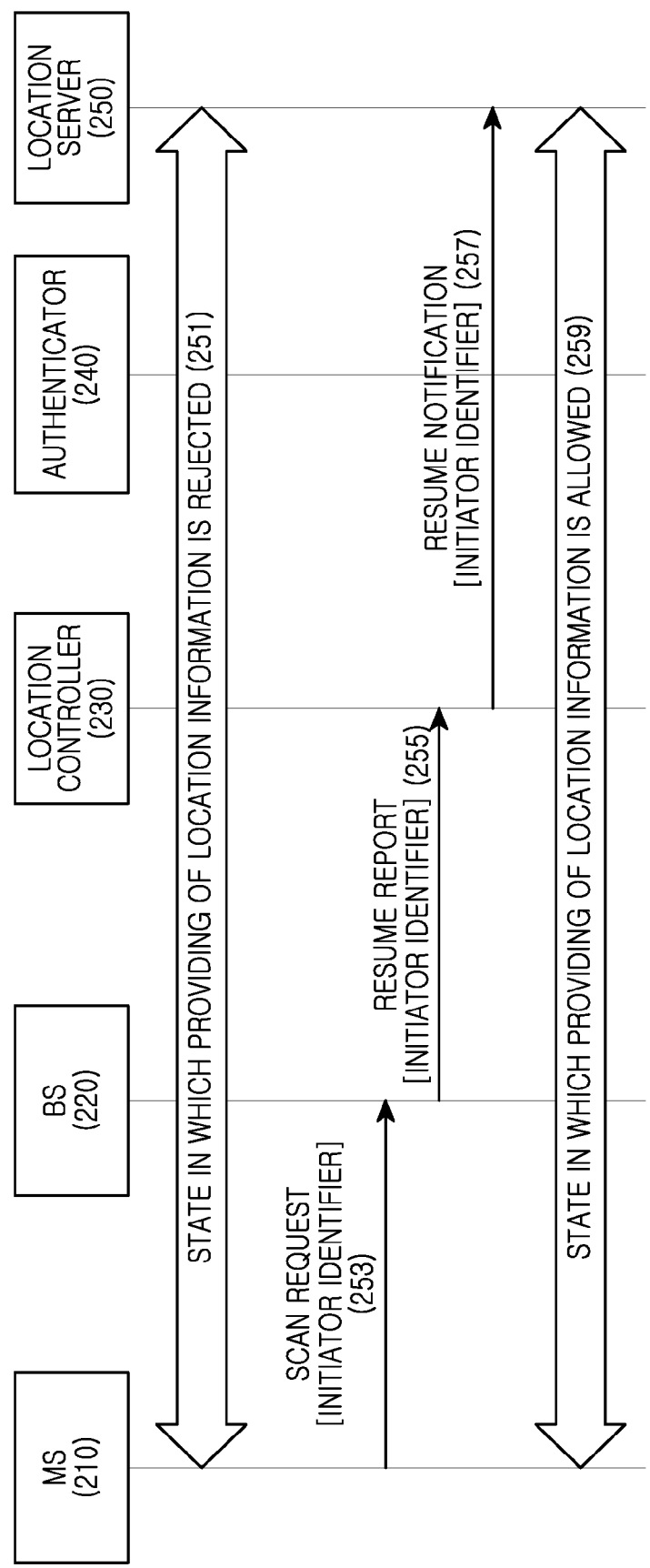
FIG. 2B illustrates a process of exchanging signals to resume providing of location information in a broadband wireless access system according to an exemplary embodiment of the present invention.

FIG. 2B illustrates a process of exchanging signals to resume providing of location information in a broadband wireless access system according to an exemplary embodiment of the present invention.

Referring to FIG. 2B, in step 251, the MS 210 is in a state in which providing of location information is rejected, and the location server 250 also recognizes that providing of location information is rejected.

In step 253, the MS 210 recognizes that providing of location information is allowed by a user's manipulation, and transmits to the BS 220 a scan request message including information for reporting that providing of location information is allowed. For convenience of explanation, the 'information for reporting providing of location information is allowed is hereinafter referred to as an 'initiator identifier'. The initiator identifier can be referred to as a Location Based Service (LBS) indicator. For example, the scan request message may be an SCN-REQ message or an AAI_SCN-REQ message. For example, the scan request message may include fields of Table 3 below.

TABLE 3

| Field | Size (bits) | Descriptions |
| --- | --- | --- |
| LBS Indication | 1 | |

In addition, the scan request message may further include fields of Table 4 below.

TABLE 4

| Field | Size (bits) | Descriptions | Condition |
| --- | --- | --- | --- |
| Scan duration | 8 | Duration (in units of AAI subframes) of the requested scanning period. | |
| Interleaving interval | 8 | The period of AMS's Active Mode (in units of AAI subframes), which is interleaved between Scan Durations. | |
| Scan Iteration | 6 | The requested number of iterating scanning interval by an AMS. | |
| Recommended start super frame number | 6 | Represents the 6 least significant bits of the absolute super frame index for which the AMS recommends the first Scanning Interval to start. This field is set to 0 if an AMS has no preferred value. | Present if AMS recommends a start super frame |
| Recommended start frame index | 2 | Recommended start frame index within a super frame. 0b00: the 1st frame in a super frame 0b01: the 2nd frame in a super frame 0b10: the 3rd frame in a super frame 0b11: the 4th frame in a super frame | Present if AMS recommends a start super frame |
| N_Recommended_ABS_Index | 6 | This is the number of neighboring ABS the AMS plans to scan, which are included in AAI-NBR-ADV message [0 . . . 63]. When an AMS receives AAI-SCNRSP message from ABS in response to AAI-SCN-REQ message, the AMS shall check whether Configuration Change Count stored by the AMS is the same as one included in AAISCN-RSP message sent by the ABS. If an AMS detects mismatch of Configuration Change Counts, it may retransmit AAI-SCN-REQ message to the ABS. | Present if AMS uses index instead of full 48-bits BSID to identify an ABS it plans to scan |
| If(N_Recommended_ABS_Index > 0) { Configuration Change Count of AAI-NBR-ADV | 3 | The value of Configuration Change Count in AAI-NBR-ADV message used for neighbor ABS index references | |
| If (Nbr_Bitmap_Index is present) { Nbr_Bitmap_Index | 8 | Each bit position corresponds to a ABS Index of the corresponding AAINBR-ADV message, where the least significant bit corresponds to the first ABS Index, each next significant | |

TABLE 4-continued

| Field | Size (bits) | Descriptions | Condition |
|---|---|---|---|
| | | bit corresponds to the next ABS Index in sequential order, the most significant bit corresponds to the ABS Index of the last requested ABS, and ABSs with ABS Index greater than the last requested ABS are not requested and do not have a corresponding bit position in the bitmap.<br>Bitmap position bit value:<br>0: the corresponding ABS is not requested.<br>1: the corresponding ABS is requested Maximum size of the bitmap is 256 bits | |
| For(i=0; i< Num of bit which is set to 1 in Nbr_Bitmap_Index; i++) {<br>N_Recommended_Carrier_Index | 6 | Number of carriers the AMS plans to scan at each neighbor ABS [0 . . . 63] | Present when a neighbor ABS is a multicarrier ABS |
| For(j=0; j<N_Recommended_Carrier_Index; j++) {<br>Recommended Carrier Index | 6 | Requested physical carrier index for scan at each neighbor ABS | |
| }<br>}<br>} else {<br>For(i=0; i<N_Recommended_ABS_Index; i++) {<br>Neighbor ABS index | 8 | ABS index corresponds to the position of ABS in AAI-NBR-ADV message. | |
| N_Recommended_Carrier_Index | 6 | Number of carriers the AMS plans to scan at each neighbor ABS [0 . . . 63] | Present when a neighbor ABS is a multicarrier ABS |
| For(j=0; j<N_Recommended_Carrier_Index; j++) {<br>Recommended Carrier Index | 6 | Requested physical carrier index for scan at each neighbor ABS | Present when a neighbor ABS is a multicarrier ABS |
| }<br>}<br>}<br>}///end of If(N_Recommended_ABS_Index > 0)<br>N_Recommended_ABS_Full | 6 | Number of neighbor ABS the AMS plans to scan which are using full 48-bit ABSID [0 . . . 63]. | Present if AMS decides to use full 48 bits BSID to identify an ABS |
| For(i=0; i< N_Recommended_ABS_Full; i++) {<br>Recommended ABS ID | 48 | ABS ID of the ABSs the AMS plans to scan | |
| N_Recommended_Carrier_Index | 6 | Number of carriers the AMS plans to scan at each neighbor ABS [0 . . . 63]. | Present when a neighbor ABS is a multicarrier ABS |
| For(j=0; j<N_Recommended_Carrier_Index; j++) {<br>Recommended Carrier Index | 6 | Requested physical carrier index for scan at each neighbor ABS | Present when a neighbor ABS is a multicarrier ABS |
| }<br>} | | | |

TABLE 4-continued

| Field | Size (bits) | Descriptions | Condition |
|---|---|---|---|
| N_Recommended_SA_Preamble_Index | 4 | Number of SA preambles the AMS plans to scan [0 . . . 15] | Present if AMS requests to scan SA preambles |
| For(i=0; i<N_Recommended_SA_Preamble_Index; i++) { SA Preamble Index | 6 | SA Preamble indices the AMS plans to scan | Present if AMS requests to scan SA preambles |
| } N_Recommended_Carrier_Index_at_Serving_ABS | 6 | Number of carriers the AMS plans to scan at each neighbor ABS. | Present if AMS decides to scan other carriers of the S-ABS |
| For(i=0; i<N_Recommended_Carrier _Index_at_Serving_ABS; i++) { Recommended Carrier index at S-ABS | 6 | Recommended physical carrier index of the S-ABS the AMS plans to scan | Present if AMS decides to scan other carriers of the S-ABS |
| } for (i=0; i<N_CSG_ID_Infos; i++) { | | N_CSG_ID_Infos is the number of CSG ID Information blocks [0 . . . 15]. | Optional for loop. May be included for quick CSG membership detection or ABS reselection assistance |
| Operator ID of the CSG Femtocell | 24 | The Operator ID of the CSG Femtocell | Present if the Operator ID is different from the one of the ABS |
| for (j=0; j<N_CSG_IDs; j++) { | | N_CSG_IDs is the number of CSG IDs belongs to this Operator ID. | |
| CSGID | variable | The CSGID within the Operator ID. It may be part of the BS ID, with certain bits inside indicating its length. If the CSG has single BS, it may be of maximum length which is the LSB-24 bits of the full BS ID. | |
| } ] | | | |

In step 255, upon receiving the scan request message including the initiator identifier, the BS 220 transmits to the location controller 230 a resume notify message including the initiator identifier. In step 257, upon receiving the resume notify message, the location controller 230 transmits to the location server 250 the resume notify message including the initiator identifier. Accordingly, the location server 250 recognizes that the MS 210 allows providing of the location information.

In step 259, the MS 210 is in a state in which providing of location information is allowed, and the location server 250 also recognizes that the MS 210 allows providing of location information through step 257. Therefore, when the location server 250 receives the location information of the MS 210 after step 257, the location server 250 transmits a measurement request message to request the MS 210 to measure data required for location determination.

If a requestor which is rejected to receive location information of the MS 210 requests providing of the location information of the MS 210 when providing of the location information of the MS 210 is allowed, although not shown, the location server 250 can perform a process of determining a location of the MS 210 after step 257, and can provide the location information. That is, the requestor of the location information can reserve providing of location information when the MS 210 is in the state in which providing of location information is allowed. In this case, when the MS 210 is in the state in which providing of location information is allowed, the location server 250 provides the location information of the MS 210 to the requestor.

Hereinafter, an operation and structure of an MS, a BS, and a location server for controlling whether to provide location information as described above will be described with reference to the accompanying drawings.

For convenience of explanation, 'data measured by the MS and required for location determination of the location server' is hereinafter referred to as 'location determination data'.

Figure 3:
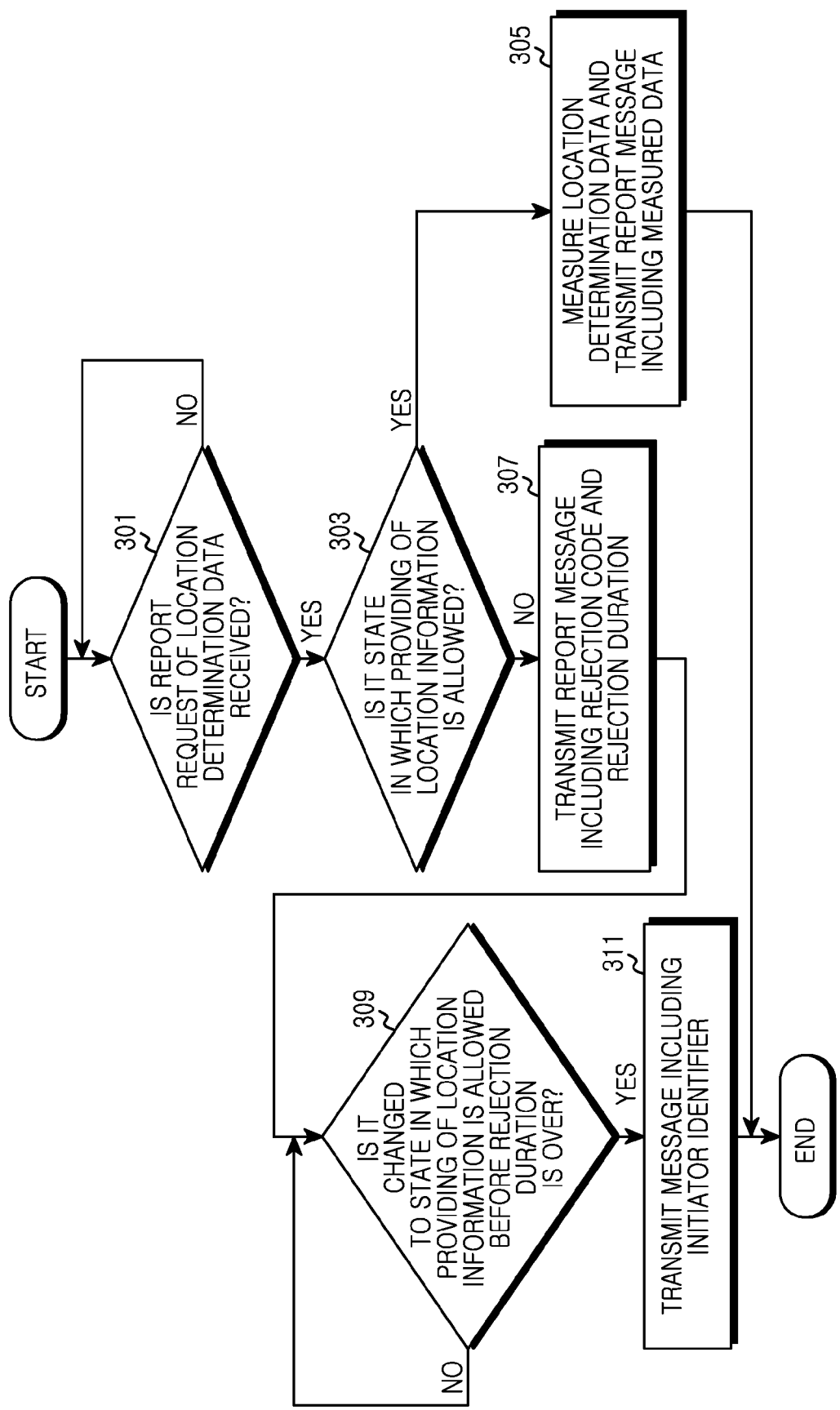
FIG. 3 illustrates a process of operating a Mobile Station (MS) in a broadband wireless access system according to an exemplary embodiment of the present invention.

FIG. 3 illustrates a process of operating an MS in a broadband wireless access system according to an exemplary embodiment of the present invention.

Referring to FIG. 3, the MS confirms whether a report request of location determination data is received in step 301.

For example, the report request may be an unsolicited SCN-RSP message or an unsolicited AAI_SCN-RSP message. In this case, the report request may include information for indicating a metric to be measured by the MS. For example, the metric may include at least one of CINR, RSSI, RTD, and RD.

Upon receiving the report request, the MS determines whether providing of location information is allowed in a current state in step 303. In other words, the MS confirms whether it is in a state in which providing of location information is allowed by using user's configuration information. In this case, although not shown, the MS can inquire the user whether to allow providing of location information and can confirm a choice of the user. The inquiry can be achieved by displaying of an inquiry screen on a display means or by outputting announcement words for the inquiry through a speaker.

If it is determined in step 303 that the state in which providing of location information is allowed, the MS measures the location determination data and transmits a report message including measured data in step 305. That is, the MS measures a parameter corresponding to a metric included in the report request. Thereafter, the MS transmits a report message including a measurement result. For example, the report message may be an SCN-REP message or an AAI_SCN-REP message.

In contrast, if it is determined in step 303 that it is not the state in which providing of location information is allowed, in other words, if it is in a state in which providing of location information is rejected, the MS transmits a report message including a rejection code and a rejection duration in step 307. In this case, the rejection duration can be set by a pre-defined value, and can be set by any value selected by the user. For example, the rejection code and the rejection duration can be defined as shown in Table 1 above.

In step 309, the MS confirms whether the current state changes to the state in which providing of location information is allowed before the rejection duration is over. In other words, the MS confirms whether configuration information is changed to allow providing of location information before the rejection duration is over. Herein, the configuration information can be changed by a user's manipulation or when a pre-defined condition is satisfied.

If the current state is changed to the state in which providing of location information is allowed before the rejection duration is over, the MS transmits a message including an initiator identifier in step 311. For example, the message may be an SCN-REQ message or an AAI_SCN-REQ message. For example, the initiator identifier can be defined as shown in Table 3 above.

Figure 4:
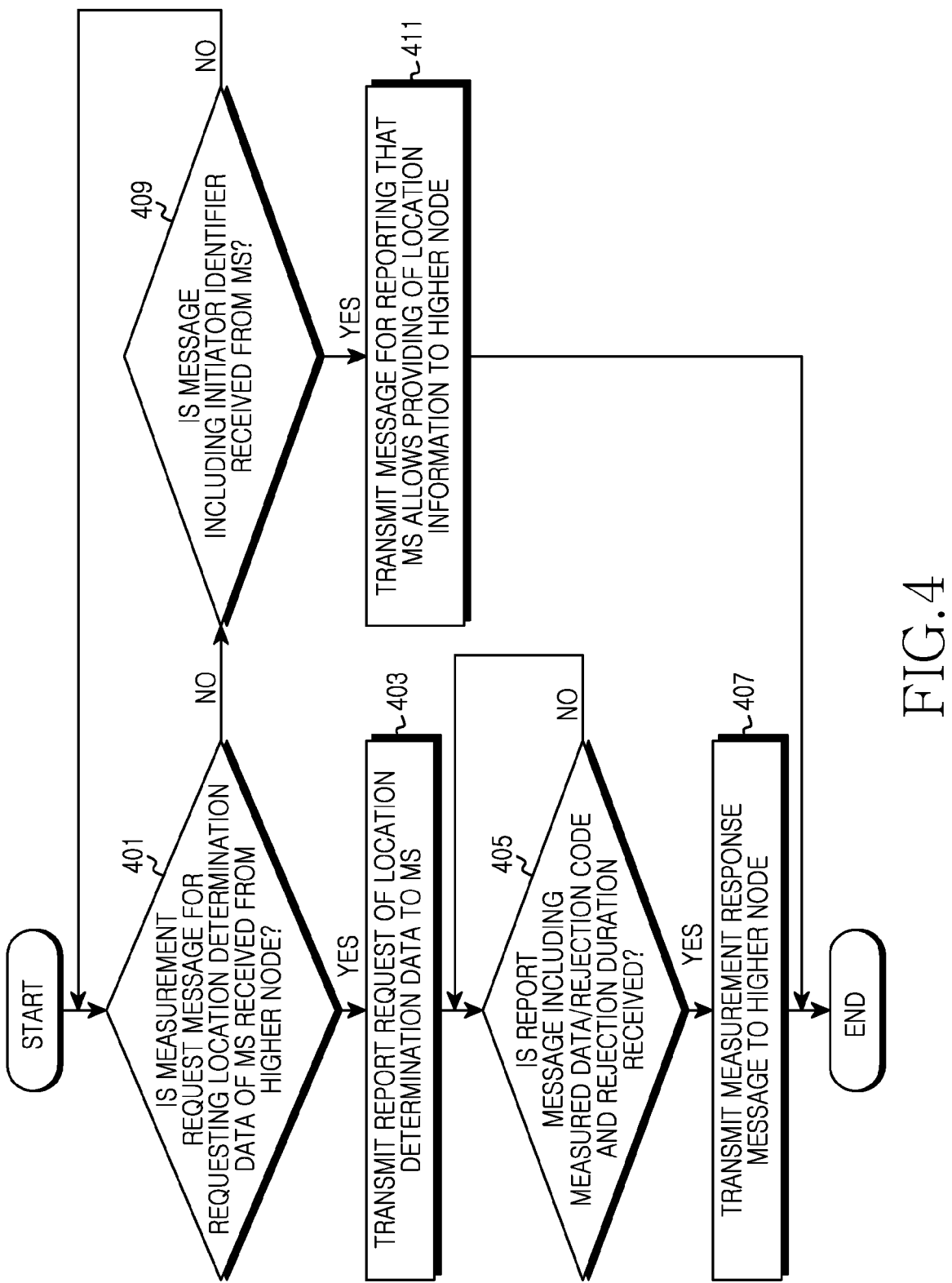
FIG. 4 illustrates a process of operating a Base Station (BS) in a broadband wireless access system according to an exemplary embodiment of the present invention.

FIG. 4 illustrates a process of operating a BS in a broadband wireless access system according to an exemplary embodiment of the present invention.

Referring to FIG. 4, the BS confirms whether a measurement request message for requesting location determination data of an MS is received from a higher node in step 401. For example, the higher node can be an ACR for performing a function of a location controller.

Upon receiving the measurement request message, the BS transmits a report request of the location determination data to the MS in step 403. For example, the report request may be an unsolicited SCN-RSP message or an unsolicited AAI_SCN-RSP message. In this case, the report request may include information for indicating a metric to be measured by the MS. For example, the metric may include at least one of CINR, RSSI, RTD, and RD.

In step 405, the BS confirms whether a report message including measured data or a report message including a rejection code and a rejection duration is received. That is, if the MS is in the state in which providing of location information is allowed, the report message including the measured data is received, and if the MS is in the state in which providing of location information is rejected, the report message including the rejection code and the rejection duration is received. For example, the rejection code and the rejection duration can be defined as shown in Table 1 above. For example, the report message may be an SCN-REP message or an AAI_SCN-REP message.

Upon receiving the report message, the BS transmits to the higher node a measurement response message including information included in the report message in step 407. In other words, the BS transmits to the higher node the measurement response message including the measured data or the measurement response message including the rejection code and the rejection duration.

If the measurement request message is not received in step 401, the BS confirms whether a message including an initiator identifier is received from the MS in step 409. The initiator identifier is information for reporting that the MS in the state in which providing of location information is rejected allows providing of location information. For example, the message may be an SCN-REQ message or an AAI_SCN-REQ message. For example, the initiator identifier can be defined as shown in Table 3 above.

Upon receiving the message including the initiator identifier, the BS transmits a message for reporting that the MS allows providing of location information to the higher node in step 411. For example, the message can be referred to as a resume notify message. For example, the BS transmits the resume notify message including the initiator identifier to the higher node.

Figure 5A:
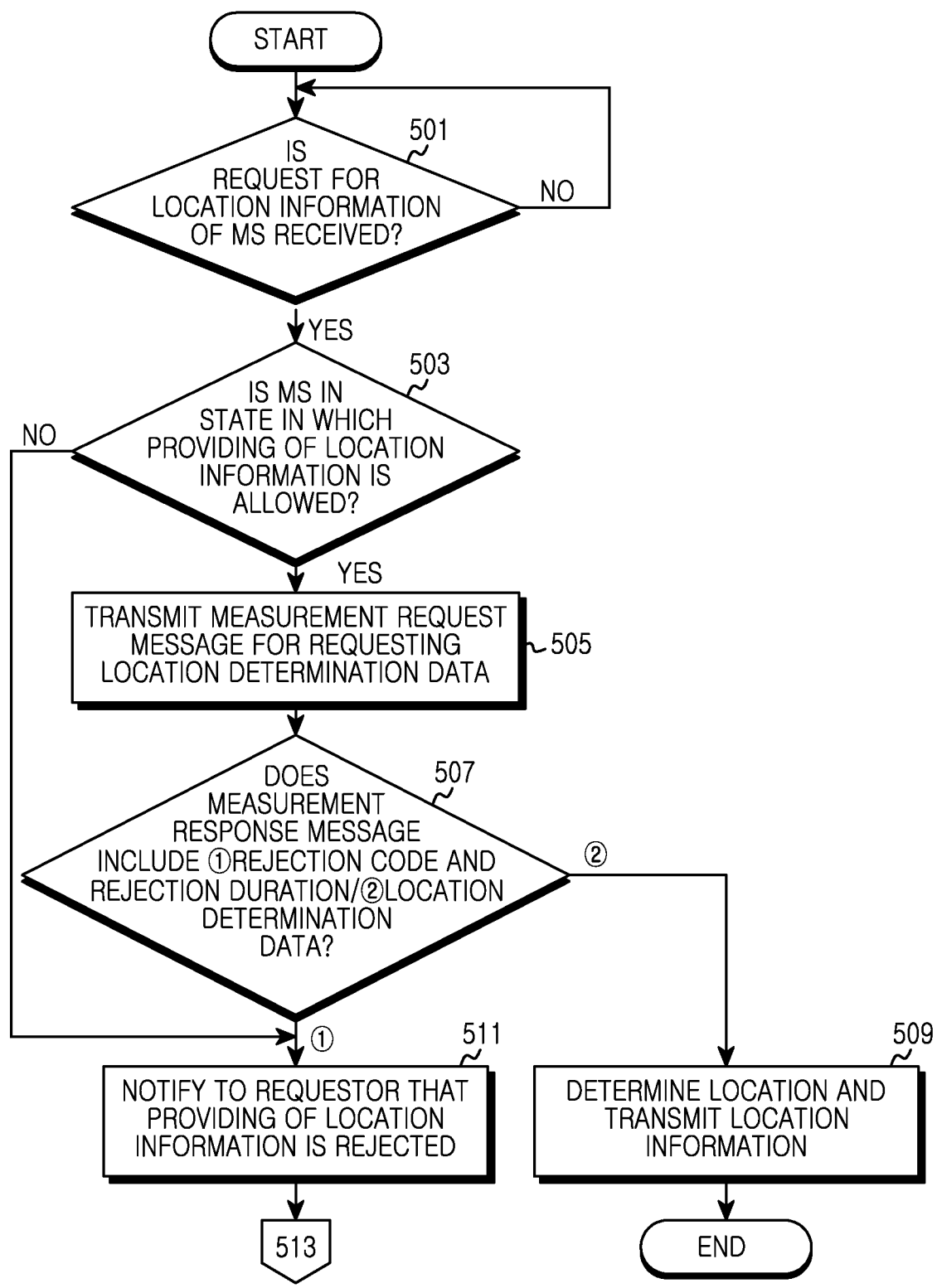
FIGS. 5A and 5B illustrate a process of operating a location server in a broadband wireless access system according to an exemplary embodiment of the present invention.
Figure 5B:
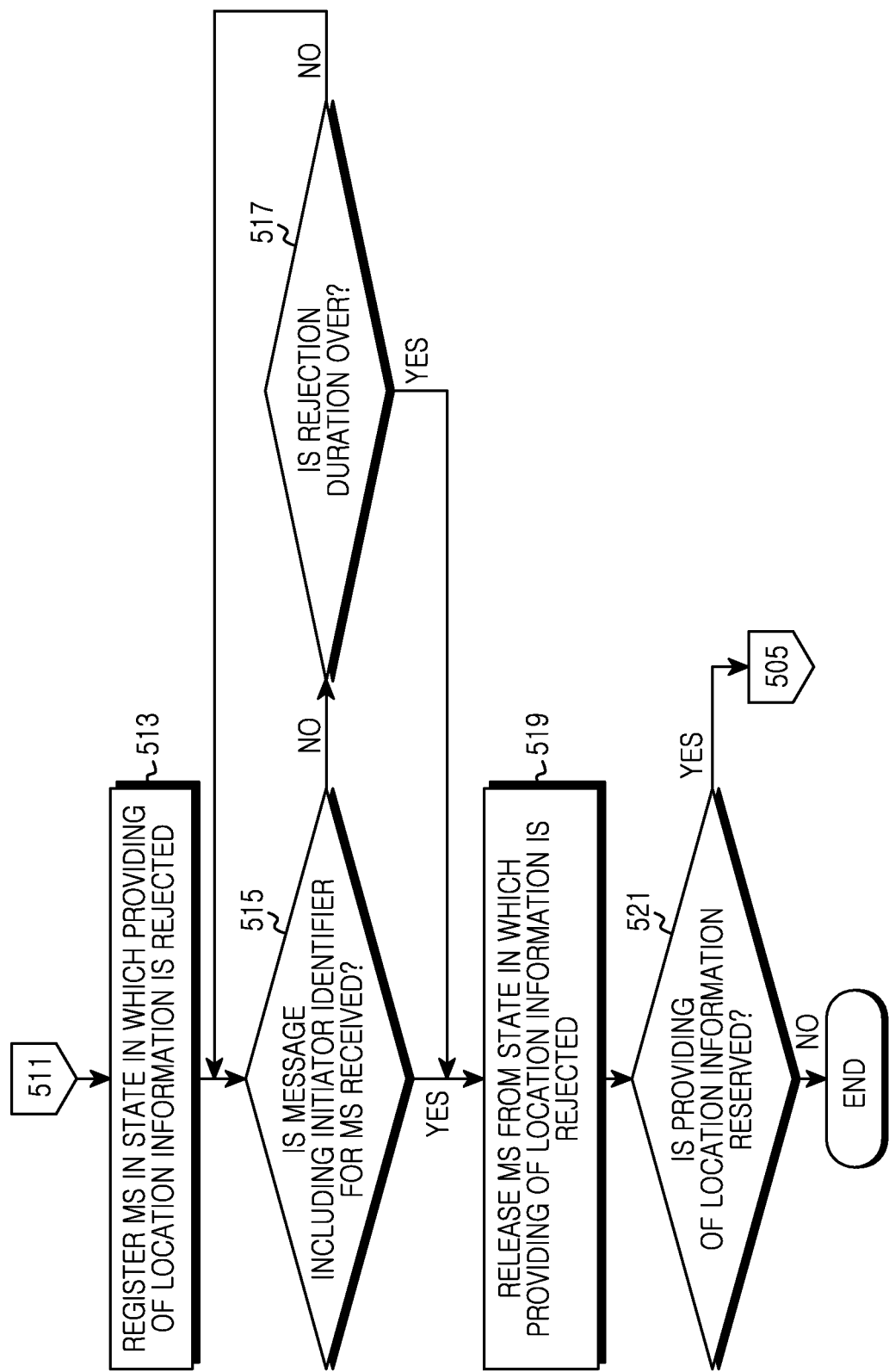

FIGS. 5A and 5B illustrate a process of operating a location server in a broadband wireless access system according to an exemplary embodiment of the present invention.

Referring to FIGS. 5A and 5B, the location server confirms whether a request for location information of an MS is received in step 501. The request for location information includes identification information for the MS. A requester which requests the location information may be another MS.

Upon receiving the request for location information of the MS, the location server confirms whether the MS is in a state in which providing of location information is allowed in step 503. For example, the location server can manage a list of users who reject to provide location information. In this case, the location server confirms whether the list includes the identification information of the MS. In this case, although not shown, the location server can perform an authentication process with respect to the MS, and can confirm whether the MS operates in an active mode by using an authenticator for managing the MS. If the MS operates in an idle mode, the location server can request an ACR for performing a paging operation to wake up the MS. If it is determined in step 503 that the MS is not in the state in which providing of location information is allowed, in other words, if the MS is in a state in which providing of location information is rejected, the procedure proceeds to step 511.

In contrast, if the MS is in the state in which providing of location information is allowed, the location server transmits a measurement request message for requesting the location determination data in step 505. The measurement request message may include information for specifying a metric to be measured by the MS. For example, the metric may include at least one of CINR, RSSI, RTD, and RD. The measurement request message can be transmitted to the ACR for performing a function of the location controller.

In step 507, the location server receives a measurement response message in response to the measurement request message, and confirms whether the measurement response message includes a rejection code and a rejection duration or whether the measurement response message includes the location determination data. That is, when the MS remains in the state in which providing of location information is allowed, the location determination data is included, and when the MS changes to the state in which providing of location information is rejected, the rejection code and the rejection duration are included. For example, the rejection code and the rejection duration can be defined as shown in Table 1 above.

If the location determination data is included in the measurement response message, the location server determines a location of the MS by using the location determination data, and transmits location information of the MS to the requestor in step 509. In other words, the location server estimates the location of the MS by using data measured by the MS according to a pre-defined location calculation algorithm, and transmits the location information to the requestor.

In contrast, if the measurement response message includes the rejection code and the rejection duration, the location server notifies to the requestor that providing of location information is rejected in step 511. According to another exemplary embodiment of the present invention, although not shown, after notifying that providing of the location information is rejected, the location server can receive a reservation for providing the location information from the requestor. That is, the requestor can reserve providing of the location information when the rejection of providing the location information of the MS is released. In this case, the location server records reservation contents. For example, the location server can manage a list of reservation contents. In this case, the location server appends identification information of the requestor and the MS to the list. According to yet another exemplary embodiment of the present invention, the reservation can be included preliminarily in the location information request of step 501.

In step 513, the location server registers the MS in the state in which providing of location information is rejected. For example, the location server can manage a list of users who reject to provide location information. In this case, the location server appends the identification information of the MS to the list.

After registering the MS in the state in which providing of location information is rejected, the location server confirms whether a message including an initiator identifier for the MS is received in step 515. The initiator identifier is information for reporting that the MS in the state in which providing of location information is rejected allows providing of location information. For example, the message can be referred to as a resume notify message. If it is determined in step 515 that the message including the initiator identifier is not received, the location server determines in step 517 whether the rejection duration confirmed in step 507 is over.

If it is determined in step 515 that the message including the initiator identifier is received or if it is determined in step 517 that the rejection duration is over, the location server releases the MS from the state not capable of providing location information in step 519. For example, the location server can manage the list of users who reject to provide location information. In this case, the location server deletes the identification information of the MS from the list.

After releasing the MS from the state not capable of providing location information, the location server determines whether there is a reservation for providing location information of the MS in step 521. For example, the location server can manage a list of reservation contents. In this case, the location server confirms whether the list includes the identification information of the MS. If the reservation of providing the location information of the MS exists, the location server confirms identifier information of the requestor corresponding to the reservation from the list, and the procedure returns to step 505. That is, if the reservation exists, the location server performs a process of determining a location of the MS.

Figure 6:
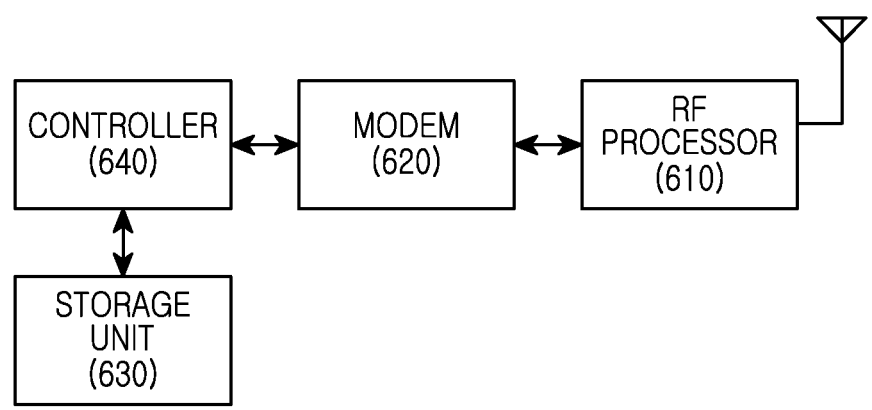
FIG. 6 is a block diagram of an MS in a broadband wireless access system according to an exemplary embodiment of the present invention.

FIG. 6 is a block diagram of an MS in a broadband wireless access system according to an exemplary embodiment of the present invention.

Referring to FIG. 6, the MS includes a Radio Frequency (RF) processor 610, a modem 620, a storage unit 630, and a controller 640.

The RF processor 610 performs a function for transmitting and receiving a signal through a wireless channel by performing signal band conversion, amplification, etc. That is, the RF processor 610 up-converts a baseband signal provided from the modem 620 into an RF signal, and transmits the RF signal through an antenna, and also down-converts an RF signal received through the antenna into a baseband signal. For example, the RF processor 610 can include an amplifier, a mixer, an oscillator, a Digital to Analog Converter (DAC), an Analog to Digital Converter (ADC), etc.

The modem 620 performs a function for performing conversion between the baseband signal and a bit-stream according to a physical layer protocol. For example, when using Orthogonal Frequency Division Multiplexing (OFDM), in data transmission, the modem 620 generates complex-valued symbols by coding and modulating a transmission bit-stream, maps the complex-valued symbols to subcarriers, and performs an Inverse Fast Fourier Transform (IFFT) operation and a Cyclic Prefix (CP) insertion, thereby constituting OFDM symbols. In addition, in data reception, the modem 620 splits the baseband signal provided from the RF processor 610 on an OFDM symbol basis, restores signals mapped to the subcarriers by using a Fast Fourier Transform (FFT) operation, and restores a reception bit-stream by performing demodulation and decoding.

The storage unit 630 stores data, such as a basic program for operating the MS, an application program, system configuration information, user configuration information, etc. Furthermore, the storage unit 630 provides the stored data at the request of the controller 640.

The controller 640 provides overall control to the MS. For example, the controller 640 generates a transmission packet to provide it to the modem 620, and interprets a reception packet provided from the modem 620. In addition, the controller 640 measures location determination data at the request of the location server, and controls a function for providing the location determination data. The controller 640 controls whether to provide the location determination data. For example, the controller 640 controls the MS to operate as described above with reference to FIG. 3.

To control whether to provide the location determination data, the controller 640 operates as follows. Upon receiving a report request of the location determination data, the controller 640 determines whether a current state is a state in which providing of location information is allowed. In this case, the controller 640 can inquire a user whether to allow providing of location information and can confirm a choice of the user. If it is in the state in which providing of location information is allowed, the controller 640 measures the location determination data and transmits a report message including measured data. In contrast, if it is in the state in which providing of location information is rejected, the controller 640 generates a report message including a rejection code and a rejection duration, and transmits the report message via the modem 620 and the RF processor 610. For example, the rejection code and the rejection duration can be defined as shown in Table 1 above. Thereafter, when the current state is changed to the state in which providing of location information is allowed before the rejection duration is over, the controller 640 generates a message including an initiator identifier, and transmits the message including the initiator identifier via the modem 620 and the RF processor 610. For example, the initiator identifier can be defined as shown in Table 3 above.

Figure 7:
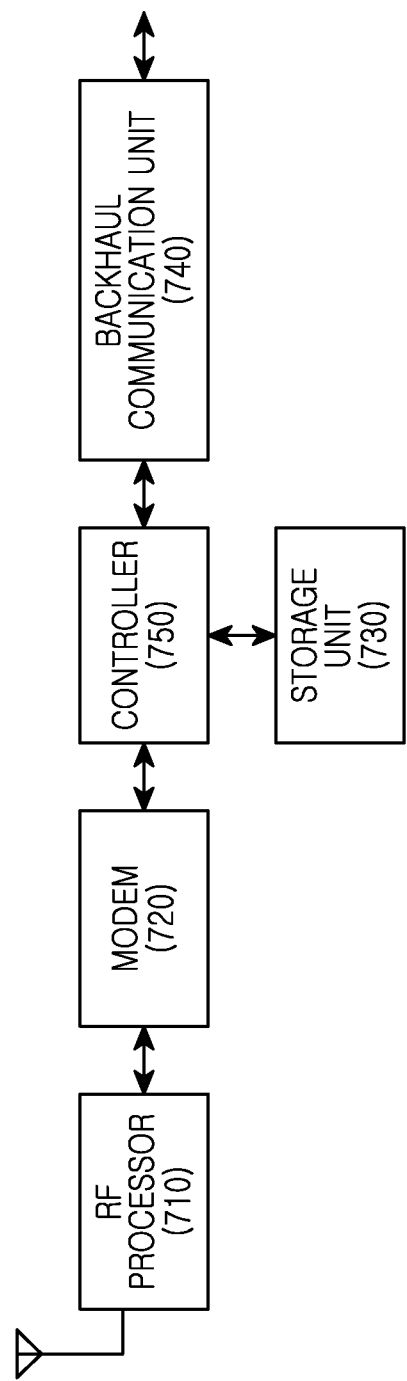
FIG. 7 is a block diagram of a BS in a broadband wireless access system according to an exemplary embodiment of the present invention.

FIG. 7 is a block diagram of a BS in a broadband wireless access system according to an exemplary embodiment of the present invention.

Referring to FIG. 7, the BS includes an RF processor 710, a modem 720, a storage unit 730, a backhaul communication unit 740, and a controller 750.

The RF processor 710 performs a function for transmitting and receiving a signal through a wireless channel by performing signal band conversion, amplification, etc. That is, the RF processor 710 up-converts a baseband signal provided from the modem 720 into an RF signal, and transmits the RF signal through an antenna, and also down-converts an RF signal received through the antenna into a baseband signal. For example, the RF processor 710 can include an amplifier, a mixer, an oscillator, a DAC, an ADC, etc.

The modem 720 performs a function for performing conversion between the baseband signal and a bit-stream according to a physical layer protocol. For example, when using OFDM, in data transmission, the modem 720 generates complex-valued symbols by coding and modulating a transmission bit-stream, maps the complex-valued symbols to subcarriers, and performs an IFFT operation and a CP insertion, thereby constituting OFDM symbols. In addition, in data reception, the modem 720 splits the baseband signal provided from the RF processor 710 on an OFDM symbol basis, restores signals mapped to the subcarriers by using a FFT operation, and restores a reception bit-stream by performing demodulation and decoding.

The storage unit 730 stores data, such as a basic program for operating the BS, an application program, system configuration information, etc. Furthermore, the storage unit 730 provides the stored data at the request of the controller 750. The backhaul communication unit 740 provides an interface through which the BS can communicate with ACRs for performing a function of higher nodes, e.g., a location controller, an authenticator, etc. That is, the backhaul communication unit 740 converts a bit-stream transmitted from the BS to the higher node into a physical layer signal, and converts a physical signal received from the higher node into a bit-stream.

The controller 750 provides overall control to the BS. For example, the controller 750 generates a transmission packet to provide it to the modem 720, and interprets a reception packet provided from the modem 720 or the backhaul communication unit 740. More particularly, the controller 750 processes a message for controlling whether to provide location determination data of the MS. For example, the controller 750 controls the BS to operate as described above with reference to FIG. 4.

To process the message for controlling whether to provide the location determination data of the MS, the controller 750 operates as follows. Upon receiving a measurement request message for requesting the location determination data of the MS from a higher node, the controller 750 transmits a report request of the location determination data to the MS. Thereafter, upon receiving the report message from the MS via the RF processor 710 and the modem 720, the controller 750 generates a measurement response message including information included in the report message, and transmits the measurement response message to the higher node via the backhaul communication unit 740. In this case, if the MS is in the state in which providing of location information is allowed, the report message including the measured data is received, and if the MS is in the state in which providing of location information is rejected, the report message including the rejection code and the rejection duration is received. For example, the rejection code and the rejection duration can be defined as shown in Table 1 above. Upon receiving a message including an initiator identifier from the MS via the RF processor 710 and the modem 720, the controller 750 generates a message for reporting that the MS allows providing of location information, and transmits the message to the higher node via the backhaul communication unit 740. For example, the initiator identifier can be defined as shown in Table 3 above.

Figure 8:
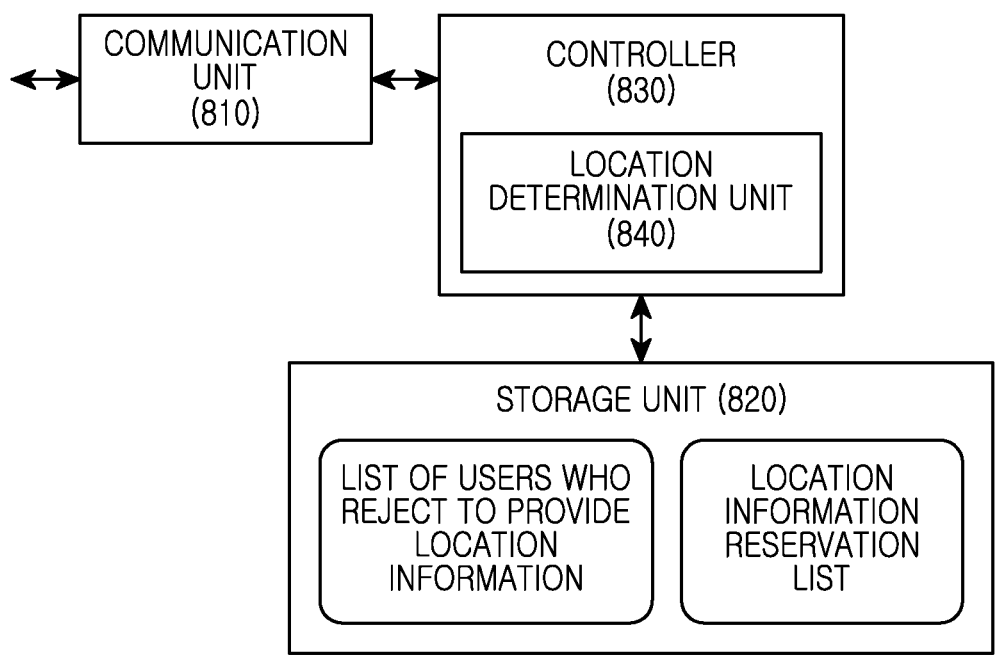
FIG. 8 is a block diagram of a location server in a broadband wireless access system according to an exemplary embodiment of the present invention.

FIG. 8 is a block diagram of a location server in a broadband wireless access system according to an exemplary embodiment of the present invention.

Referring to FIG. 8, the location server includes a communication unit 810, a storage unit 820, and a controller 830.

The communication unit 810 provides an interface for performing communication with other entities in a network. The storage unit 820 stores basic programs for operating the location server, configuration information, etc. More particularly, the storage unit 820 stores a list of users who reject to provide location information, and the list includes identification information of the users who reject to provide the location information. In addition, the storage unit 820 can store a location information reservation list including contents reserved to provide location information of an MS which rejects to provide location information.

The controller 830 provides overall control to the location server. For example, the controller 830 requests the MS to report location determination data according to a location information request of the MS. A location determination unit 840 included in the controller 830 calculates a location of the MS according to a pre-defined location calculation algorithm. More particularly, the controller 830 determines whether there is a request of location determination data according to whether the MS rejects to provide location information. For example, the controller 830 controls the location server to operate as described above with reference to FIG. 5.

To control a process of requesting location determination data according to whether the user rejects to provide location information, the controller 830 operates as follows. Upon generation of a location information request of the MS from a requestor, the controller 830 confirms whether the MS is in a state in which providing of location information is allowed. For example, the controller 830 confirms whether identification information of the MS is included in the list showing users who reject to provide location information and stored in the storage unit 820. If the MS is in the state in which providing of location information is rejected, the controller 830 notifies to the requestor that providing of location information is rejected. In contrast, if the MS is in the state in which providing of location information is allowed, the controller 830 generates a measurement request message for requesting location determination data, and transmits the measurement determination data via the communication unit 810.

Thereafter, the controller 830 confirms whether a measurement response message received via the communication unit 810 includes a rejection code and a rejection duration, or whether the measurement response includes location determination data. That is, when the MS remains in the state in which providing of location information is allowed, the location determination data is included, and when the MS changes to the state in which providing of location information is rejected, the rejection code and the rejection duration are included. For example, the rejection code and the rejection duration can be defined as shown in Table 1 above. If the measurement response message includes the rejection code and the rejection duration, the controller 830 notifies the requestor that providing of location information is rejected. Furthermore, the controller 830 registers the MS in the state in which providing of location information is rejected. For example, the controller 830 can append identification information of the MS to the list showing users who reject to provide location information and stored in the storage unit 820. After registering the MS in the state in which providing of location information is rejected, if the message including the initiator message is received or if the rejection duration is over, the controller 830 releases the MS from the state of not capable of providing location information.

According to another exemplary embodiment of the present invention, after notifying that providing of location information is rejected, the controller 830 can receive a reservation for providing location information from the requestor. Upon receiving the reservation, the controller 830 appends identification information of the requestor and the MS to the location information reservation list stored in the storage unit 820. According to yet another exemplary embodiment of the present invention, the reservation may be preliminarily included in an initial location information request. Furthermore, upon occurrence of the reservation, if the MS is released from the state in which providing of location information is rejected, the controller 830 performs a process of determining a location of the MS without an additional request.

According to exemplary embodiments of the present invention, since an MS delivers user's rejection information in a broadband wireless access system, measurement data can be prevented from being requested again from a location server when a BS retransmits a request message or when a timeout occurs. In addition, when a user intends to resume a service within a rejection duration delivered to a location server, an initiator identifier can be delivered to effectively resume a location-based service.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for an operation of a Mobile Station (MS) in a wireless access system, the method comprising:
   receiving a request to report measurement data required for location determination;
   determining whether the MS is in a first state in which providing of location information is rejected; and
   if it is determined that the MS is in the first state in which providing of location information is rejected, transmitting a response message for indicating that reporting of the measurement data is rejected and including a rejection duration in which providing of location information is rejected; and
   if the MS changes to a second state in which providing of location information is allowed before the rejection duration is over, transmitting a resume message for indicating that reporting of the measurement data is allowed.

2. The method of claim 1, wherein the response message includes an indicator which is set by one of a value for rejecting to provide location information and a value for allowing to provide location information.

3. The method of claim 1, wherein the request to report measurement data required for location determination includes information for specifying a metric to be measured.

4. The method of claim 3, wherein the metric includes at least one of a Carrier Interference and Noise Ratio (CINR), a Received Signal Strength Indicator (RSSI), a Round Trip Delay (RTD), and a Relative Delay (RD).

5. A method for an operation of a Base Station (BS) in a wireless access system, the method comprising:
   transmitting a request to report measurement data required for location determination to a Mobile Station (MS);
   receiving a response message for indicating that reporting of the measurement data is rejected and including a rejection duration in which providing of location information is rejected;
   notifying to a higher node that providing of location information is rejected; and
   receiving a resume message for indicating that reporting of the measurement data is allowed, wherein the resume message is received from the MS if the MS changes to a state in which providing of location information is allowed before the rejection duration is over.

6. The method of claim 5, wherein the response message includes an indicator which is set by any one of a value for rejecting to provide location information and a value for allowing to provide location information.

7. The method of claim 5, further comprising, upon receiving the resume message, notifying to the higher node that providing of location information is allowed.

8. An apparatus for a Mobile Station (MS) in a wireless access system, the apparatus comprising:
   a modem for receiving a request to report measurement data required for location determination; and
   a controller for determining whether the MS is in a first state in which providing of location information is rejected,
   wherein the modem, transmits a response message for indicating that reporting of the measurement data is rejected and including a rejection duration in which providing of location information is rejected if it is determined that the MS is in the first state in which providing of location information is rejected, and, transmits a resume message for indicating that reporting of the measurement data is allowed if the MS changes to a second state in which providing of location information is allowed before the rejection duration is over.

9. The apparatus of claim 8, wherein the response message includes an indicator which is set by one of a value for rejecting to provide location information and a value for allowing to provide location information.

10. The apparatus of claim 8, wherein the request to report measurement data required for location determination includes information for specifying a metric to be measured.

11. The apparatus of claim 10, wherein the metric includes at least one of a Carrier Interference and Noise Ratio (CINR), a Received Signal Strength Indicator (RSSI), a Round Trip Delay (RTD), and a Relative Delay (RD).

12. An apparatus for a Base Station (BS) in a wireless access system, the apparatus comprising:

a modem for transmitting a request to report measurement data required for location determination to a Mobile Station (MS), and for receiving a response message for indicating that reporting of the measurement data is rejected and including a rejection duration in which providing of location information is rejected; and a controller for notifying to a higher node that providing of location information is rejected, wherein the modem receives a resume message for indicating that reporting of the measurement data is allowed, wherein the resume message is received from the MS if the MS changes to a state in which providing of location information is allowed before the rejection duration is over.

13. The apparatus of claim 12, wherein the response message includes an indicator which is set by one of a value for rejecting to provide location information and a value for allowing to provide location information.

14. The apparatus of claim 12, wherein upon receiving the resume message, the controller notifies to the higher node that providing of location information is allowed.

* * * * *